US009037797B2

(12) United States Patent
McGroddy-Goetz et al.

(10) Patent No.: US 9,037,797 B2
(45) Date of Patent: May 19, 2015

(54) INTELLIGENT CACHING

(75) Inventors: Kathleen A. McGroddy-Goetz, New Fairfield, CT (US); Pamela A. Nesbitt, Raleigh, NC (US); Sandeep R. Patil, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 13/114,135

(22) Filed: May 24, 2011

(65) Prior Publication Data

US 2012/0303896 A1 Nov. 29, 2012

(51) Int. Cl.
*G06F 12/00* (2006.01)
*G06F 12/08* (2006.01)
*G06F 12/12* (2006.01)

(52) U.S. Cl.
CPC ........ *G06F 12/0866* (2013.01); *G06F 12/0868* (2013.01); *G06F 2212/263* (2013.01); *G06F 12/126* (2013.01); *G06F 2212/264* (2013.01)

(58) Field of Classification Search
CPC . G06F 12/08; G06F 12/0866; G06F 12/0804; G06F 12/0862; G06F 12/0871; G06F 12/0888; G06F 3/067; G06F 3/06; G06F 2212/263
USPC ......................................................... 711/118
See application file for complete search history.

(56) References Cited

U.S. PATENT DOCUMENTS

2006/0236033 A1* 10/2006 Guinn et al. .................. 711/118
2009/0178131 A1 7/2009 Hudis et al.
2009/0178132 A1 7/2009 Hudis et al.
2009/0281825 A1* 11/2009 Larsen ............................ 705/2
2010/0030866 A1 2/2010 Bedi
2011/0022658 A1 1/2011 Pace et al.
2011/0246518 A1* 10/2011 Mehrotra et al. ............. 707/770

OTHER PUBLICATIONS

Ely, M.; "How Healthcare Organizations Can Tap the Cloud for Archiving"; Google/Aspect Software Inc.; Feb. 2010 (retrieved from online Apr. 6, 2011).
"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.
IBM Redbooks; "IBM Information Infrastructure Solutions Handbook"; ip.com; Jun. 2010.
Iron Mountain Healthcare; "A Cloud Storage Solution for Unstructured Data"; Google/Iron Mountain Digital Record Center for Medical Images; 2010. (retrieved from online Apr. 6, 2011).
Pao-Ching Chen-et al.; "Implementing RAID-3 on Cloud Storage for EMR System"; INSPEC/IEEE; pp. 850-853; 2010.

(Continued)

*Primary Examiner* — Reginald Bragdon
*Assistant Examiner* — Hannah A Faye-Joyner
(74) *Attorney, Agent, or Firm* — Cantor Colburn LLP

(57) ABSTRACT

Intelligent caching includes defining a cache policy for a data source, selecting parameters of data in the data source to monitor, the parameters forming a portion of the cache policy, and monitoring the data source for an event based on the cache policy. Upon an occurrence of an event, the intelligent caching also includes retrieving target data subject to the cache policy from a first location and moving the target data to a second location.

24 Claims, 6 Drawing Sheets

(56) References Cited

OTHER PUBLICATIONS

Stratus Technologies; "Stratus Supports Hospital's Cloud Computing Program With Simple, Cost-Effective High Availability"; Google/EMR Daily News; Nov. 2010. (retrieved from online Apr. 6, 2011).

White, J.; "Cloud Computing in Healthcare: Is there a Silver Lining?"; Google/Aspen Advisors; Dec. 2010. (retrieved from online Apr. 6, 2011).

* cited by examiner

INTELLIGENT CACHING

BACKGROUND

The present invention relates to computer memory management, and more specifically, to intelligent caching techniques.

Network-managed data by service providers has become increasingly popular, as the amount of data utilized by business enterprises and organizations has increased. The costs associated with hardware and storage devices, as well as their associated bandwidth requirements have made network-managed solutions more desirable. One of the known challenges of this solution is the control of the data being stored by a service provider. While the data is owned by the business enterprise, it is not always under the control of the business enterprise, e.g., when bandwidth constraints for the network are present or when network systems become inoperable for various reasons. Indeed, there are SLA policies adherence in place, but the risk still remains that network-stored data may become unavailable to the data owner.

What is desirable, therefore, is a way to increase the availability of network-stored data when it is needed.

SUMMARY

According to one embodiment of the present invention, a method for intelligent caching is provided. The method includes defining a cache policy for a data source, selecting parameters of data in the data source to monitor, the parameters forming a portion of the cache policy, and monitoring the data source for an event based on the cache policy. Upon an occurrence of the event, the method includes retrieving target data subject to the cache policy from a first location and moving the target data to a second location.

According to another embodiment of the present invention, a system for intelligent caching is provided. The system includes a computer processor and logic executable by the computer processor. The logic is configured to implement a method. The method includes defining a cache policy for a data source, selecting parameters of data in the data source to monitor, the parameters forming a portion of the cache policy, and monitoring the data source for an event based on the cache policy. Upon an occurrence of the event, the method includes retrieving target data subject to the cache policy from a first location and moving the target data to a second location.

According to a further embodiment of the present invention, a computer program product for intelligent caching is provided. The computer program product includes a storage medium having computer-readable program code embodied thereon, which when executed by a computer processor, causes the computer processor to implement a method. The method includes defining a cache policy for a data source, selecting parameters of data in the data source to monitor, the parameters forming a portion of the cache policy, and monitoring the data source for an event based on the cache policy. Upon an occurrence of the event, the method includes retrieving target data subject to the cache policy from a first location and moving the target data to a second location.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
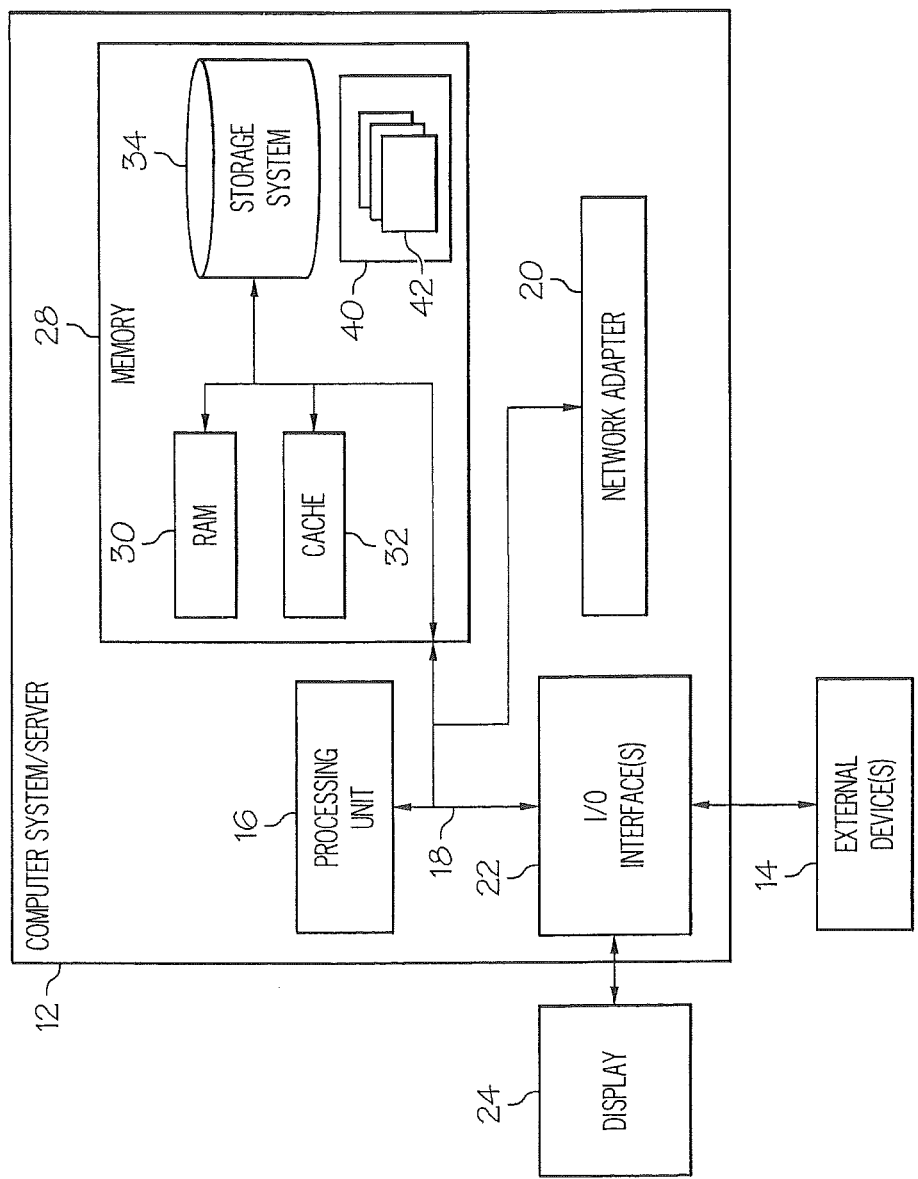
FIG. 1 depicts a cloud computing node according to an embodiment of the present invention.

Exemplary embodiments relate to intelligent caching, which provide the ability to ensure the availability of, and access to, data residing in a network environment. In one exemplary embodiment, the network environment operates via a cloud infrastructure in which the storage of, and access to, data storage is managed by a service provider on behalf of the data owner and/or end user. The intelligent caching minimizes risks inherent with network storage systems. That is, the intelligent caching includes configurable caching policies to ensure that relevant data is cached where and when it is needed. The exemplary intelligent caching provides cloud caching techniques that are influenced by dynamic and real time events and data. The intelligent caching processes may be incorporated with existing cache techniques (e.g., locality of reference model), push cache policies, or system/network performance enhancing policies, or may operate as a standalone system. In an exemplary embodiment, control over the data residing in the network cloud is provided to the owner or manager of the data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
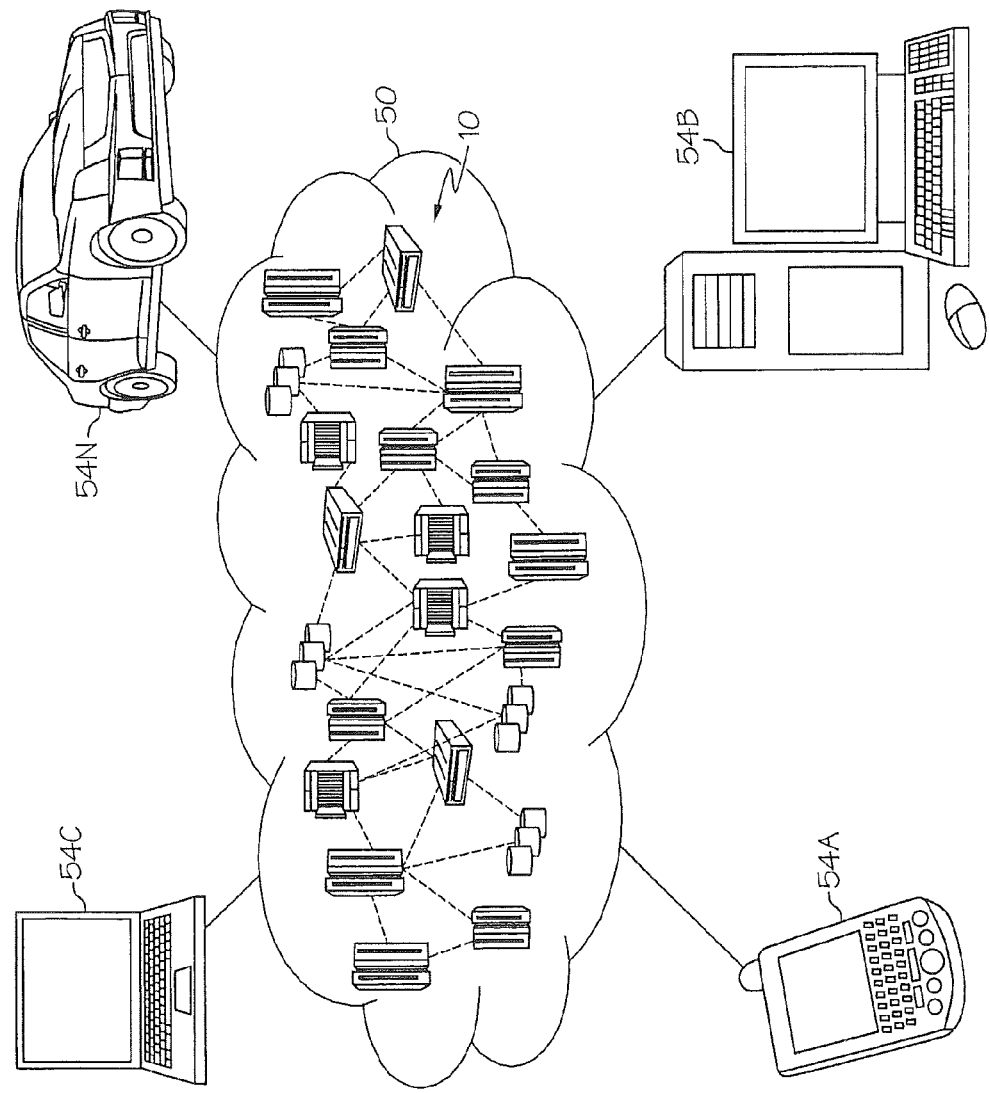
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
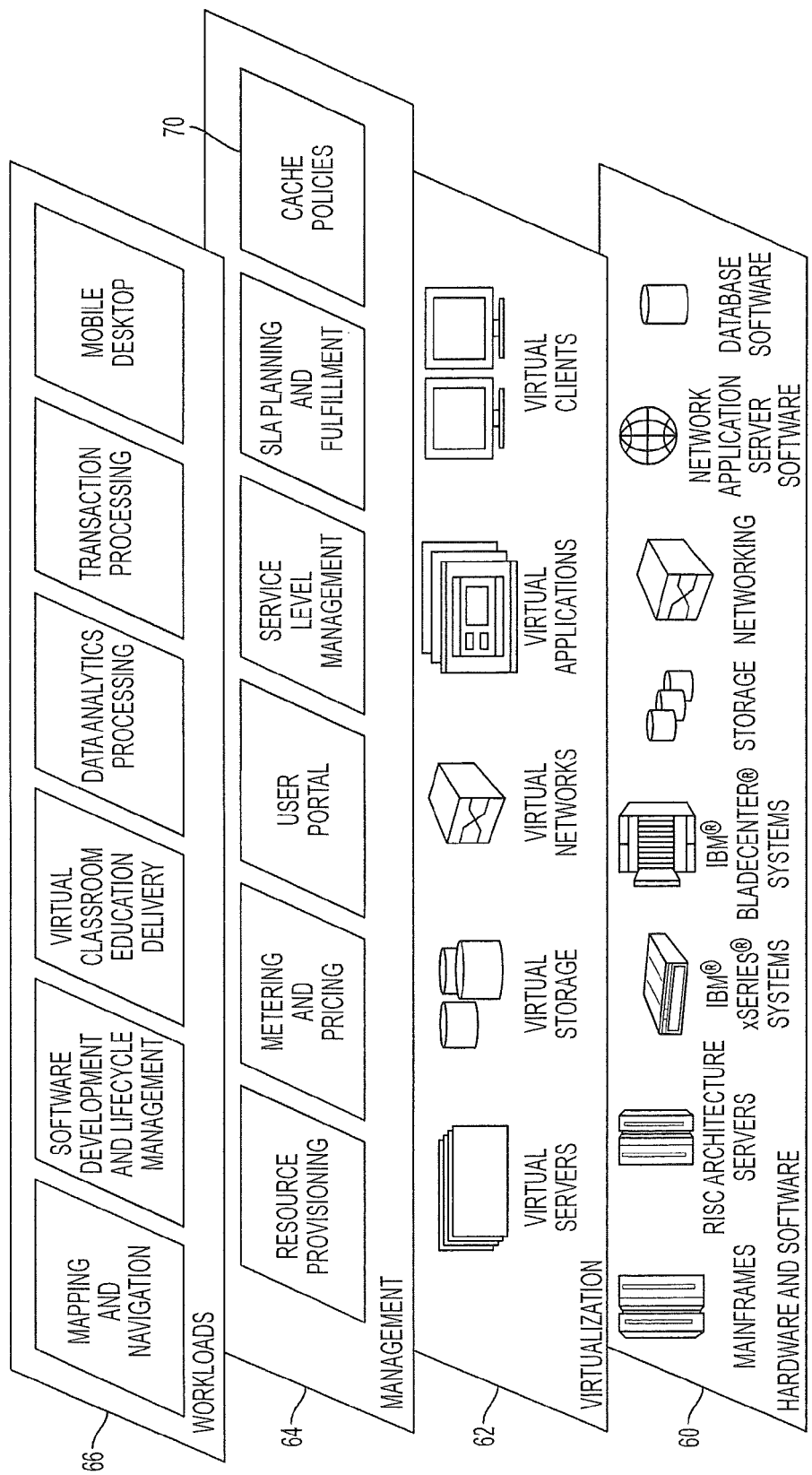
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, a cache policy application or logic 70 in the management layer 64 implements the intelligent caching processes described herein; however, it will be understood that the application or logic 70 may be implemented in any layer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The cache policy logic 70 includes one or more algorithms to implement embodiments described herein to provide intelligent caching services. In an embodiment, the cache policy logic 70 is coupled to and/or resides in the memory 28 shown in FIG. 1. In addition, embodiments of the cache policy logic 70 include one or more program modules 42 of the program/utility 40 shown in FIG. 1. In a further embodiment, the cache policy logic 70 is part of the management layer 64 and is executed on hardware located in the hardware and software layer 60.

The exemplary intelligent caching services may be implemented by a client system (e.g., computer system 12) configured to monitor source data for events, the occurrence of which cause the cache policy logic 70 to download target data from the network (e.g., cloud computing network 50) and store the target data locally on or near the client system (e.g., in a local cache). In an exemplary embodiment, the cache policy logic 70 includes a user interface (see, e.g., FIG. 6) that enables a user or authorized individual to create caching policies and select sources of data to be monitored.

Figure 4:
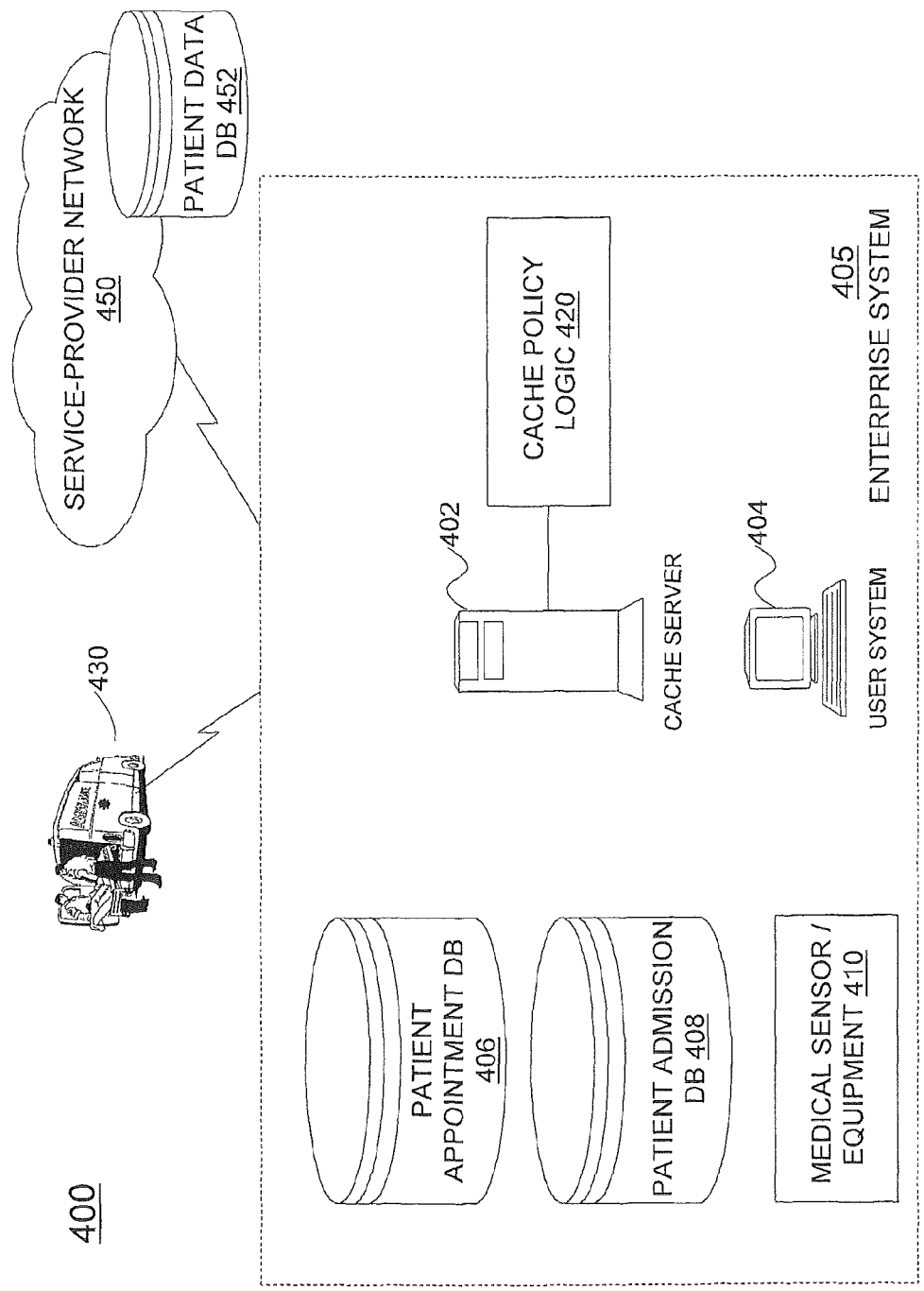
FIG. 4 depicts a block diagram of a system upon which intelligent caching may be implemented according to an embodiment of the present invention.

Turning now to FIG. 4, a system upon which the intelligent caching services may be implemented will now be described. For purposes of illustration, the system 100 shown in FIG. 4 describes a healthcare implementation of the intelligent caching processes. However, it will be understood that the intelligent caching processes may be used in any environment in which data is stored on a network and managed by a service provider on behalf of a data owner/manager. The example system 100 shown in FIG. 4 is illustrative in nature and is not to be construed as limiting in scope.

The system 100 of FIG. 4 includes an enterprise system 405 in communication with a service provider network 450. The enterprise system 405 represents an organization that owns, or has certain access rights to, the data subject to the intelligent caching processes described herein. For example, enterprise system 405 may be a hospital or group of affiliated medical facilities that provide healthcare and related services to patients.

The enterprise system 405 includes a cache server 402 in communication with a user system 404, a patient appointment database 406, a patient admissions database 408, and various medical sensors and/or equipment 410. The cache server 402 may communicate with the user system 404, databases 406/408, and sensor/equipment 410 either directly (e.g., wireline or cabling) or may be in communication over a network (e.g., a local area network or virtual private network).

The user system 404 may be any type of computer device, such as a personal desktop, laptop, or portable hand held computer device. The user system 404 may be operated by an administrator (e.g., in configuring cache policies) or medical staff personnel (e.g., in the performance of patient care or related activities). While only a single cache server and user system are shown in FIG. 1 for ease of description, it will be understood that any number of cache servers and user systems may be used in implementing the exemplary intelligent caching processes described herein.

In an embodiment, the patient appointment database 406 stores a file or index of patient appointments entered, e.g., by an operator of the user system 404. The patient appointment database 406 may store an index of upcoming or scheduled appointments that have been entered via a patient appointment application or software tool. For example, a sample appointment index may include parameters for storing the following types of information:

Appointment Date Patient Identifier Appointment Type

Additional (or alternative) data may be used in the appointment application or software tool. The above-referenced parameters are provided for illustrative purposes only.

In one embodiment, the patient admissions database 408 stores a file or index of patient admissions data entered, e.g., by an operator of the user system 404. The patient admissions database 408 may store an index of all patients admitted (i.e., having an admissions status, such as 'in-patient') to the hospital. For example, a sample admission index may include parameters for storing the following types of information:

Admission Date Patient Identifier Initial Diagnosis

Additional or alternative data may be used in an admission application or software tool that is used to enter this data. The above-referenced parameters are provided for illustrative purposes only.

In an embodiment, the medical sensor/equipment 410 may include any diagnostic or patient care device that receives patient data (e.g., vital signs) from patients of the hospital either directly through sensors attached to the patient or otherwise in communication with the patient, or through medical staff input to the equipment 410. The medical sensor/equipment 410 may include any type of medical device (e.g., an electrocardiograph machine, an automated blood pressure device, or an automated external defibrillator (AED), to name a few) that is capable of transmitting its sensor data to a collection device, such as the cache server 402.

Also shown in FIG. 4 is a medical vehicle 430 (e.g., an emergency vehicle), which includes communications components (e.g., a radio, cellular telephone, etc.) to communicate medical-related information to the enterprise system 405. For example, the medical vehicle 430 may be an ambulance en route to the hospital associated with the enterprise system 405. Medical personnel (e.g., EMTs) may convey important patient data, such as a person's vital statistics to the cache server 402, which in turn may be used by the cache policy logic 420 to determine the occurrence of cache events, as described further herein.

The service provider network 450 may be implemented, e.g., as the cloud computing environment 50 shown in FIG. 2. The service provider network 450 may be a data storage management facility that manages data stored (e.g., in a patient data database 452) on behalf of its clients (e.g., enterprise system 405). The service provider network 450 may store patient records, lab test results, x-ray or CT scan images, or any other type of medical- and patient-related data. The information stored by the service provider network 450 may be classified or organized using a key or similar data structure used to store and retrieve data as needed. For example, the data may be stored using a unique patient identifier as a key.

In an exemplary embodiment, the cache server 402 executes the cache policy logic 70, which is shown in FIG. 4 has cache policy logic 420. The cache policy logic 420 may be configured by an administrator or authorized individual of the enterprise system 405 to establish policies for determining what data (e.g., from the patient data database 452) will be cached in the cache server 402 and when the data will be cached. The cache policy logic 420 may also be configured to define sources of data subject to the intelligent caching processes. For example, using the example shown in FIG. 4, the sources of data may include the patient appointment database 406, the patient admissions database 408, the medical sensor/equipment 410, and the vehicle 430. It will be understood by those skilled in the art that other types of data sources may be employed in implementing the intelligent caching processes described herein.

Figure 5:
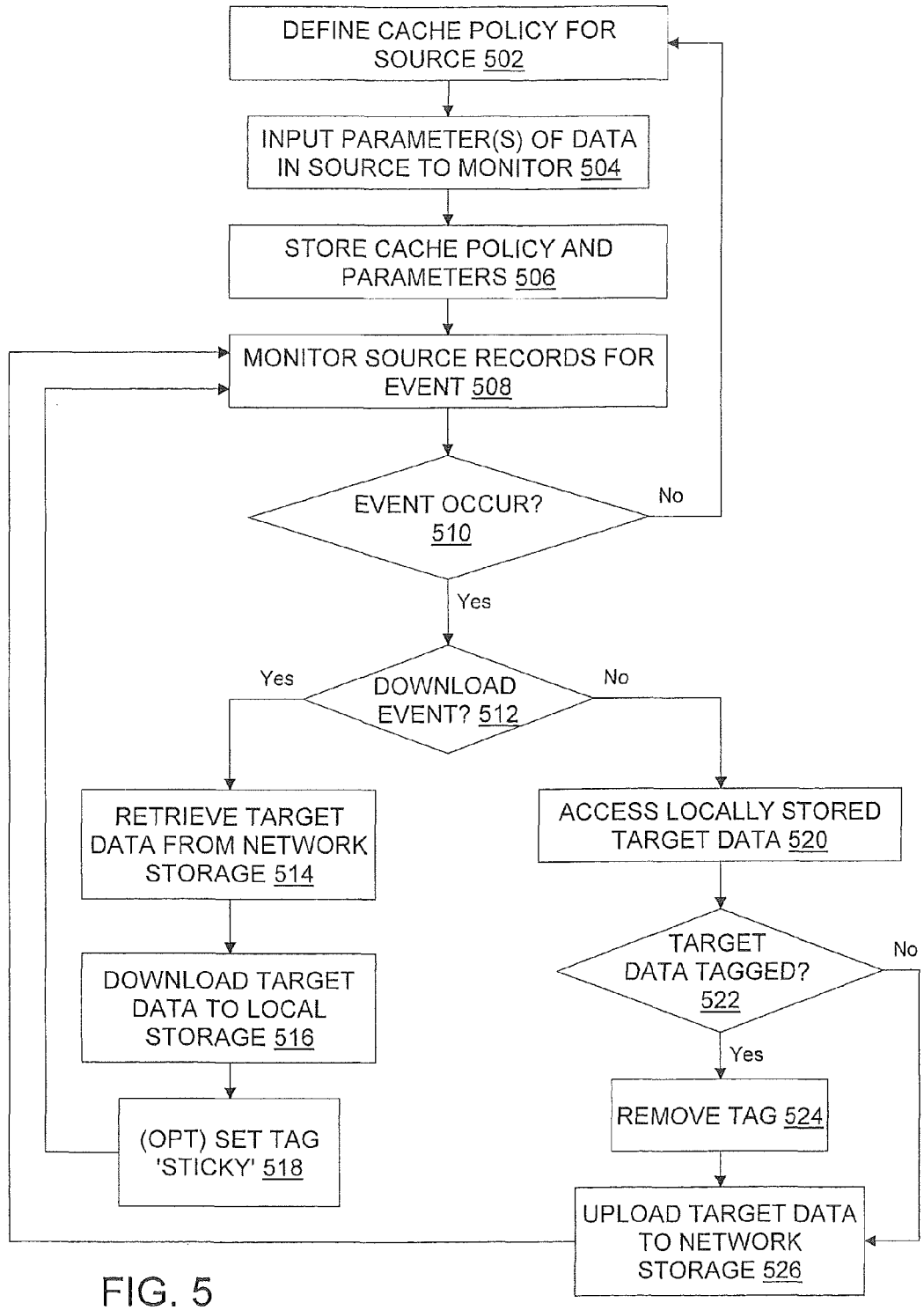
FIG. 5 depicts a flow diagram of a process for providing intelligent caching according to an embodiment of the present invention.
Figure 6:
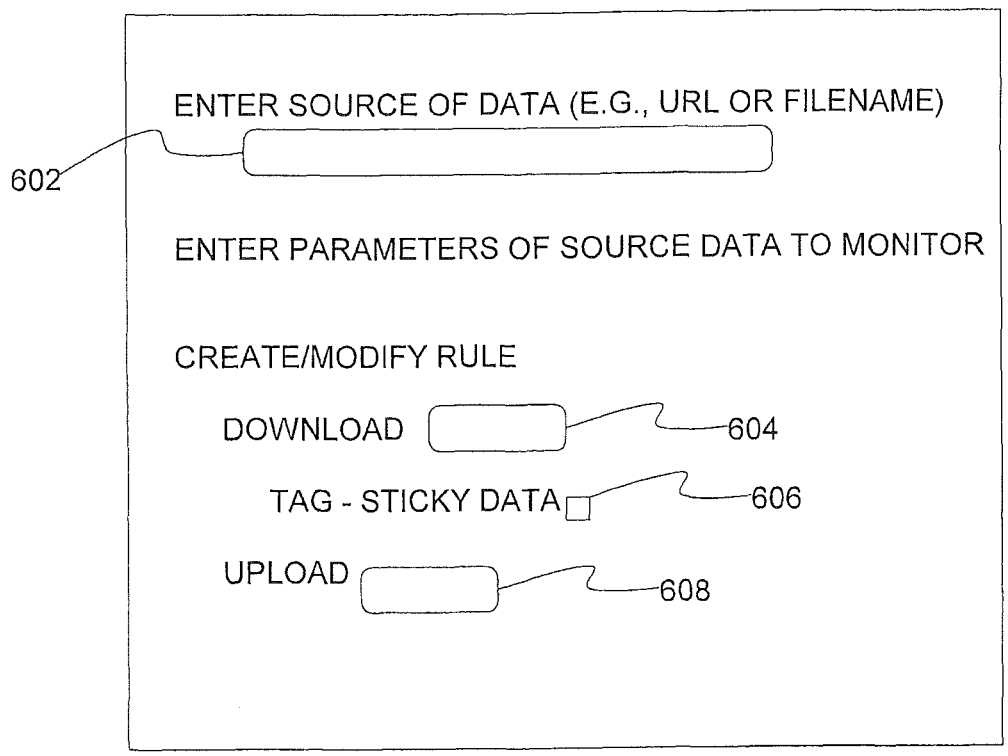
FIG. 6 depicts a user interface screen for use in implementing intelligent caching according to an embodiment of the present invention.

Turning now to FIGS. 5 and 6, an exemplary flow diagram and user interface screen 600 describing the intelligent caching processes will now be described. Steps 502-506 describe a set-up process in which a user may configure the cache policies via the user interface screen 600 and cache policy logic 420, and steps 508-526 describe the execution of these established policies.

At step 502, a user defines a cache policy for a data source (e.g., one of sources 406, 408, 410, and 430 of FIG. 4) via the user interface screen 600. As shown in FIG. 6, the user may enter the source of data to be monitored using the input box 602 of screen 600. The user may also create a rule via boxes 604, 606, and 608 of the screen 600. For example, suppose the data source is the patient appointment database 406. The rule may be to monitor the file or index of the patient appointment database 406 for an appointment date parameter. The rule might state, e.g., for appointments in the file, access all patient records in the patient database 452 forty-eight hours before the scheduled appointment date (e.g., via the appointment date parameter) and store these records locally in the cache server 402 (e.g., local cache). The access may be implemented using the patient identifier in the file as the key. The parameter, 'appointment date' may be input by selecting the ENTER PARAMETERS OF SOURCE DATA TO MONITOR option on the user interface screen 600 at step 504.

In another example, suppose the source data is the sensor/equipment 410 in the enterprise system 405 or the vehicle 430. In this example, the parameters to be monitored may depend on the type of sensors/equipment used (e.g., heart rate, blood pressure, patient temperature, etc.) or the type of information conveyed by an EMT or device to the enterprise system 405. The rule may be defined such that specific patient records are to be cached locally at the cache server 402 if the values of these parameters monitored reach a certain threshold (e.g., indicating the patient is in critical condition).

At step 506, the cache policy is stored along with the selected parameters.

At step 508, the cache policy logic 420 monitors the data source for an event. For example, using the example above, if the data source is the patient appointment database 406, the event may be an appointment date of a patient that falls within the 48-hour time frame indicated in the rule; that is, 48 hours before a scheduled appointment date, all patient records for patients with scheduled appointments on the scheduled date will be retrieved from the patient data database 452 in the network 450 and stored locally in the cache server 402 to ensure availability of the data when it is needed.

In one embodiment, the cache policy logic 420 can be configured to determine download events and upload events. The download events refer to events in which data stored in the network (e.g., network 450) are retrieved and stored locally in the cache server 402 (i.e., the enterprise system 405 requires the patient data), while upload events refer to events in which data stored locally in the cache server 402 are uploaded to the patient data database 452 in the network 450 (i.e., the enterprise system 450 no long requires the patient data).

At step 510, it is determined whether the event has occurred. If not, the process returns to step 502 and the cache policy logic 420 continues to monitor the data source.

If, however, the event has occurred at step 510, the cache policy logic 420 determines whether the event is a download event or an upload event at step 512. For example, if the data source being monitored is the patient admissions database 408, and the admissions database 408 indicates that a patient is being processed to be admitted as an in-patient, then the event is a download event and the patient records stored in the patient data database 452 are retrieved at step 514 and downloaded to the cache server 402 at step 516. The data is targeted for download and is referred to herein as 'target data.' As shown in FIG. 6, the user establishing the rule for the data source with respect to a download event may use the DOWNLOAD option 604 to define this event. In addition, the cache policy logic 420 may be configured to tag high-priority target data or target data that is needed for an extended period of time with a STICKY DATA tag option 606 on the user interface screen 600 at step 518. In one embodiment, the target data is tagged as sticky data by associating a sticky data tag with a patient file of a patient who is assigned to an intensive care unit, or whose medical data is examined at a threshold frequency level. In another embodiment, the target data is tagged when medical sensors receiving the target data indicate that specified medical parameters have reached a defined threshold value (e.g., heart rate exceeding 'x' bpm). In this manner, the cache policy logic 420 can distinguish data that is lower priority or data that is needed for a brief time period with other data that is more important (e.g., for critical patients with long term or chronic illnesses). The effect of tagging the data via the option 606 may be to ensure that the data is not taken out of cache storage, e.g., in the event of an unforeseen circumstance such as a system outage, storage memory reaching its capacity, or other event. The process then returns to step 508 where the cache policy logic 420 continues to monitor the data source.

Turning back to step 512, if the event is an upload event, the cache policy logic 420 accesses locally stored data in the cache server 402 at step 520. As the locally store data is the target of the data to be moved, it is referred to herein as target data. At step 522, the cache policy logic 420 determines whether the data has been tagged (via the option 606). If so, the cache policy logic 420 removes the tag at step 524 and uploads the target data to network storage at step 526. The process returns to step 508. If the data has not been tagged at step 522, the data is uploaded to the network storage at step 526 and the process returns to step 508.

Technical effects include a method of providing intelligent caching of data. The intelligent caching enables configurable cache policies to be created for various types of data where the data is monitored according to the policies for events, and network-stored target data are retrieved and stored locally based on the monitoring. Likewise, the policies apply to conditions affecting whether the data is needed locally, and the policies enable the data to be uploaded back to the network accordingly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
defining a cache policy for a data source to monitor;
receiving user-selectable data fields of the data source, via an interface executable by a computer, of data stored in the data source as parameters, the parameters forming a portion of the cache policy;
monitoring values of the data fields of the data source for an event based on the values in view of the cache policy; and
upon an occurrence of the event, retrieving target data subject to the cache policy from a first location and moving the target data to a second location.

2. The method of claim 1, wherein the first location is a local cache and the second location is a network storage device.

3. The method of claim 1, wherein the first location is a network storage device and the second location is a local cache.

4. The method of claim 1, wherein the event triggers one of:
a download of the target data from the first location and storing the target data in the second location, wherein the first location is a network storage device, and the second location is a local cache; and
an upload of the target data from the first location and storing the target data in the second location, wherein the first location is a local cache and the second location is a network storage device.

5. The method of claim 1, wherein defining the cache policy includes tagging the target data as sticky data, the tagging preventing the target data from being removed from the second location.

6. The method of claim 1, wherein the data source stores an index of medical patient-related data, the medical patient-related data indexed by a patient identifier, and the target data includes patient records retrievable by the patient identifier when the event occurs.

7. The method of claim 6, wherein the data source includes at least one of a patient appointment database and a patient admissions database, and the parameters include at least one of an appointment date, an admissions status, and a diagnosis.

8. The method of claim 6, wherein defining the cache policy includes tagging the target data as sticky data, the tagging including associating a sticky data tag with at least one of: a patient who is assigned to an intensive care unit, a patient whose medical data is examined at a threshold frequency level, and medical sensors receiving the target data when specified medical parameters reach a defined threshold value.

9. The method of claim 1, wherein the data source is an emergency vehicle transporting a patient to a medical facility, the emergency vehicle communicating patient vital statistics of the patient to the computer over a network, wherein an occurrence of the event is determined as a function of the patient vital statistics in view of the cache policy.

10. A system, comprising:
a computer processor; and
logic executable by the computer processor, the logic configured to implement a method, the method including:
defining a cache policy for a data source to monitor;
receiving user-selectable data fields of the data source, via an interface executable by the computer processor, of data stored in the data source as parameters, the parameters forming a portion of the cache policy;
monitoring values of the data fields of the data source for an event based on the values in view of cache policy; and
upon an occurrence of the event, retrieving target data subject to the cache policy from a first location and moving the target data to a second location.

11. The system of claim 10, wherein the first location is a local cache and the second location is a network storage device.

12. The system of claim 10, wherein the first location is a network storage device and the second location is a local cache.

13. The system of claim 10, wherein the event triggers a download of the target data from the first location and storing the target data in the second location, wherein the first location is a network storage device, and the second location is a local cache.

14. The system of claim 10, wherein the event triggers an upload of the target data from the first location and storing the target data in the second location, wherein the first location is a local cache and the second location is a network storage device.

15. The system of claim 10, wherein defining the cache policy includes tagging the target data as sticky data, the tagging preventing the target data from being removed from the second location.

16. The system of claim 10, wherein the data source stores an index of medical patient-related data, the medical patient-related data indexed by a patient identifier, and the target data includes patient records retrievable by the patient identifier when the event occurs.

17. The system of claim 16, wherein the data source includes at least one of a patient appointment database and a patient admissions database, and the parameters include at least one of an appointment date, an admissions status, and a diagnosis.

18. The system of claim 16, wherein defining the cache policy includes tagging the target data as sticky data, the tagging including associating a sticky data tag with at least one of: a patient who is assigned to an intensive care unit, a patient whose medical data is examined at a threshold frequency level, and medical sensors receiving the target data when specified medical parameters reach a defined threshold value.

19. The system of claim 10, wherein the data source is an emergency vehicle transporting a patient to a medical facility, the emergency vehicle communicating patient vital statistics of the patient to the computer processor over a network, wherein an occurrence of the event is determined as a function of the patient vital statistics in view of the cache policy.

20. A computer program product comprising a non-transitory storage medium having computer-readable program code embodied thereon, which when executed by a computer processor, causes the computer processor to implement a method, the method comprising:
defining a cache policy for a data source to monitor;
receiving user-selectable data fields of the data source, via an interface executable by the computer processor, of data stored in the data source as parameters, the parameters forming a portion of the cache policy;
monitoring values of the data fields of the data source for an event based on the values in view of the cache policy; and
upon an occurrence of the event, retrieving target data subject to the cache policy from a first location and moving the target data to a second location.

21. The computer program product of claim 20, wherein the first location is a local cache and the second location is a network storage device.

22. The computer program product of claim 20, wherein the first location is a network storage device and the second location is a local cache.

23. The computer program product of claim 20, wherein the event triggers a download of the target data from the first location and storing the target data in the second location, wherein the first location is a network storage device, and the second location is a local cache.

24. The computer program product of claim 20, wherein the event triggers an upload of the target data from the first location and storing the target data in the second location, wherein the first location is a local cache and the second location is a network storage device.

\* \* \* \* \*